US005927336A

United States Patent [19]

Tanaka et al.

[11] Patent Number: 5,927,336

[45] Date of Patent: Jul. 27, 1999

[54] CHECK VALVE, POUCH WITH THE CHECK VALVE, AND MANUFACTURING APPARATUS THEREFOR

[75] Inventors: Mikio Tanaka, Tenri; Osamu Nakagiri, Takasago; Yoshihiro Koyanagi, Kashiwara; Hideo Nakata, Kobe, all of Japan

[73] Assignees: Kaken Kogyo Co., Ltd.; UCC Ueshima Coffee Co., Ltd.; Kashiwara Seitai Co., Ltd.; Marubeni Plax Corporation, all of, Japan

[21] Appl. No.: 08/655,006

[22] Filed: May 29, 1996

[30] Foreign Application Priority Data

May 31, 1995 [JP] Japan .................................... 7-158291

[51] Int. Cl.[6] ...................................................... F16K 15/14

[52] U.S. Cl. ........................................... 137/843; 383/103

[58] Field of Search .................................... 137/843, 223, 137/246; 446/224; 383/100, 103

[56] References Cited

U.S. PATENT DOCUMENTS

| | | | |
|---|---|---|---|
| 3,949,934 | 4/1976 | Goglio | 137/843 |
| 4,290,253 | 9/1981 | Domke et al. | 53/410 |
| 4,724,657 | 2/1988 | Roovers et al. | 53/551 |
| 4,780,378 | 10/1988 | McCartney, Jr. et al. | 137/843 |
| 4,842,007 | 6/1989 | Kurtz | 137/246 |
| 4,890,637 | 1/1990 | Lamparter | 137/246 |
| 4,975,028 | 12/1990 | Schultz | 137/843 |
| 5,048,846 | 9/1991 | Ichikawa . | |
| 5,332,095 | 7/1994 | Wu | 383/103 |
| 5,388,910 | 2/1995 | Koyanagi | 383/100 |
| 5,558,441 | 9/1996 | Morrison et al. | 383/100 |

FOREIGN PATENT DOCUMENTS

| | | | |
|---|---|---|---|
| WO9426605 | 11/1994 | European Pat. Off. . | |
| 60-13340 | 1/1985 | Japan . | |
| 61-74545 | 5/1986 | Japan . | |
| 62-251310 | 2/1987 | Japan . | |
| 62-25310 | 11/1987 | Japan . | |
| 3-14614 | 4/1991 | Japan | F16K 15/20 |
| 1292079 | 10/1972 | United Kingdom | B31B 23/74 |

*Primary Examiner*—Denise L. Ferensic
*Assistant Examiner*—Joanne Y. Kim
*Attorney, Agent, or Firm*—Webb Ziesenheim Logsdon Orkin & Hanson, P.C.

[57] ABSTRACT

A check-valved pouch has a main pouch body, and a check valve attached to the main pouch body. The main pouch body is formed of plastic film and defines an opening for receiving a substance. The check valve is formed of plastic film also, and includes a flat valve body defining an upper opening, with opposte sides and a lower end closed, and an inner passage for discharging gases toward the upper opening. A check piece formed of plastic film is disposed in an upper half of the valve body. The check valve further includes a porous filtering film disposed on one surface in a lower half of the valve body. The filtering film includes a filter surface, and a releasing film formed on the filter surface. The check valve is attached to the main pouch body, with the filtering film inserted into the main pouch body and the upper opening exposed to ambient air, whereby an interior of the main pouch body is communicable with an exterior through the filter surface, inner passage and upper opening.

12 Claims, 6 Drawing Sheets

CHECK VALVE, POUCH WITH THE CHECK VALVE, AND MANUFACTURING APPARATUS THEREFOR

BACKGROUND OF THE INVENTION

1. Field of the Invention

This invention relates to check-valved pouches and a manufacturing apparatus therefor. More particularly, the invention relates to check-valved pouches in each of which a check valve has a filter surface formed in a lower portion thereof in order to prevent a powdery or granular substance contained in the pouch from leaking out through a passage in the check valve or clogging the passage when gases are discharged from inside the pouch. The invention also relates to an apparatus for manufacturing such pouches. Further, the invention relates to check valves for use with the above pouches.

2. Description of the Related Art

Several types of check-valved pouches as noted above have been manufactured heretofore. For example, a check valve formed of plastic film is attached to a lateral edge of a main pouch body formed also of plastic film, for discharging gases from inside the main pouch body. A desired substance is placed in the the main pouch body, an interior of the main pouch body being communicable with the ambient only through a gas discharge passage in the check valve. The check valve includes a filter surface formed in a portion thereof inserted into the main pouch body, the filter surface being in communication with the gas discharge passage.

In the check-valved pouch having the above construction, the check valve has a valve body formed of thin plastic film, and the filter surface is defined by a thin plastic filtering film. The gas discharge passage is formed in a very narrow space between the plastic film and filter surface. Consequently, the filter surface tends to stick to an inner surface of the plastic film, thereby to close the gas discharge passage. This gives rise to a serious problem that the gases cannot be discharged from inside the pouch.

SUMMARY OF THE INVENTION

This invention has been made in order to solve the above problem. A primary object of the invention, therefore, is to provide a check-valved pouch which maintains an excellent filtering function of a filter surface formed in a portion of a check valve inserted into a main pouch body, as well as an excellent gas discharging function. With this pouch, the filter surface hardly sticks to an inner surface of plastic film forming a valve body. Even when the filter surface sticks to the plastic film, the filter surface is separated reliably therefrom by a pressure of gases discharged from inside the pouch. The invention also intends to provide an apparatus for manufacturing such check-valved pouches.

The above objects are fulfilled by the invention defined in the appended claims. Specifically, in one aspect of the invention, a check-valved pouch comprises:

a main pouch body formed of plastic film and defining an opening for receiving a substance; and a check valve formed of plastic film and attached to the main pouch body, the check valve including a flat valve body defining an upper opening, with other peripheries closed, and an inner passage for discharging gases toward the upper opening, a check piece disposed in an upper region of the valve body, and a porous filtering film disposed below planes of the valve body defining the inner passage, the filtering film including a filter surface, and a releasing film formed on the filter surface;

wherein the check valve is attached to the main pouch body, with the filtering film inserted into the main pouch body and the upper opening exposed to ambient air, whereby an interior of the main pouch body is communicable with an exterior through the filter surface, the inner passage and the upper opening.

Preferably, the releasing film is formed of silicon oil and/or polyethylene glycol applied to the filter surface. These substances have an excellent releasing performance.

Preferably, the check valve includes at least one heat seal portion adjacent the upper opening for narrowing the inner passage to control a discharge flow rate. This construction facilitates adjustment of the discharge flow rate.

The functions of this check-valved pouch will be described with reference to FIGS. 6 and 7.

A main pouch body A may be pressed from outside after sealing the main pouch body A with a powdery or granular substance placed therein. Then, gases (residual air and a gas generated from the content) are efficiently discharged from the main pouch body A through pores in an extensive filter surface 2*a* of a filtering film 2 into a gas discharge passage 7. These gases flow out smoothly through an opening 5. The contained substance is prevented by the filtering film 2 from being discharged.

A releasing film 2*b*, for example, of silicon oil and/or polyethylene glycol which have an excellent releasing performance is formed on the filter surface 2*a* of filtering film 2. This reliably prevents the filtering film 2 from sticking to an inner surface of a plastic film 1 to close the gas discharge passage 7. Thus, the gases are discharged smoothly from inside the main pouch body A. Naturally, the releasing film is not limited to silicon oil or polyethylene glycol, but various types of releasing film may be employed to suit different uses.

When the main pouch body A is decompressed as a result of gas discharge, ambient air tends to flow into the main pouch body A through the opening 5 of the check valve B. However, a check piece 3*a* is pressed toward the plastic film 1. As shown in FIG. 7, the check piece 3*a* moves into tight contact with an upper inner surface of film 1 to close the opening 5 of the gas discharge passage 7, thereby reliably preventing ambient air from entering the main pouch body A.

The present invention provides the following excellent effects (1) to (5):

(1) After placing a powdery or granular substance in the pouch, gases may be discharged from inside the pouch simply by pressing the pouch from outside, to decompress the pouch interior. This facilitates a long-term preservation of the content of the pouch by vacuum packing.

(2) The interior of the main pouch body is communicable with an exterior only through the filter surface, inner passage and upper opening of the check valve. With use of the check valve defining the filter surface having pores smaller than particle sizes of the contained substance, only unwanted gases are discharged from inside the pouch with all the contained substance remaining therein.

(3) The gas discharge passage is narrow and the thin plastic film and filtering film tend to stick to each other. However, the releasing film of silicon oil and/or polyethylene glycol formed on the filter surface of the filtering film reliably prevents the filtering film from sticking to the inner surface of the plastic film to close the inner passage, thereby to assure a smooth gas discharge from the pouch.

(4) The above effect is enhanced since the releasing agent or agents is/are applied to and diffused over an entire filtering film surface.

(5) When the pouch is decompressed and ambient air tends to flow into the pouch through the opening of the check valve, the check piece sensitively responds to the pressure of the incoming air, and moves into tight contact with the plastic film to close the exit of the inner passage. Thus, ambient air is stopped entering the pouch, and the content of the pouch is protected from damage due to entry of ambient air.

In another aspect of the invention, a check-valved pouch manufacturing apparatus comprises, arranged between a source of pouch forming plastic film and a pouch cutting mechanism, a folding guide for folding the pouch forming plastic film into a flat tube form, a first heat sealing device for heat sealing opposite sides of the plastic film folded to form an elongate flat tube, a second heat sealing device for heat sealing the elongate flat tube transversely thereof and at predetermined intervals to form bottom heat seal portions on the elongate flat tube, and an advancing device for intermittently advancing the plastic film;

pouches being successively cut from the flat tube received from the advance device, forwardly or rearwardly of the bottom heat seal portions, thereby manufacturing check-valved pouches intermittently, each pouch having a bottom and an opening;

wherein the manufacturing apparatus has arranged between the source of pouch forming plastic film and the folding guide:

a check valve series supply device for supplying a series of flat check valves formed of plastic film and interconnected in succession, to a surface at one side of the plastic film;

a cutting device for cutting individual check valves from the series of check valves;

a provisional check valve joining device for provisionally joining a leading end of each check valve cut to an upper surface at one side of the plastic film; and a releasing film forming device for forming a releasing film such as of silicon oil and/or polyethylene glycol having an excellent releasing performance on a reverse surface of each provisionally joined check valve.

The functions of this check-valved pouch manufacturing apparatus will be described with reference to FIGS. 9 through 11.

An elongate series 12*a* of interconnected check valves B is supplied, with a filtering film 2 of each check valve B facing down, to an upper surface of elongate plastic film 11'. A check valve cutting device 13 disposed at the source, a device 14 for provisionally joining the check valves B to the plastic film 11', and a device 15 for forming a releasing film 2*b* on the reverse surface of each check valve, operate simultaneously, whereby the cut check valves B, each with the releasing film 2*b* formed on the filtering film 2, and each provisionally joined at a leading end thereof to one side of the plastic film 11', are successively advanced forward with the plastic film 11' toward a plastic film folding guide 16.

The plastic film 11' having reached the folding guide 16 is folded into a flat tube form and, each check valve B is moved to a meeting position between the opposite sides of the plastic film 11' before advancing to a first heat sealing device 17.

The plastic film 11' folded into the flat tube form and reaching the first heat sealing device 17 already has the opposite sides thereof brought together. These opposite sides are thermally joined by the first heat sealing device 17 to form an elongate flat tube E. Each check valve B is securely attached to the flat tube E, with the filtering film 2 inserted into the flat tube E and an opening 5 projecting therefrom. The flat tube E and check valves B are advanced to a second heat sealing device 19.

The elongate flat tube E having reached the second heat sealing device 19 is heated and sealed transversely between adjacent check valves B securely attached thereto. The flat tube E, with a plurality of pouch bottom heat seal portions A3 arranged at fixed intervals, is advanced through an intermittent advancing device 20 to a pouch cutting mechanism 21. The cutting mechanism 21 successively cuts the pouches from the flat tube E forwardly or rearwardly of the heat seal portions A3. As a result, the check-valved pouches are continuously manufactured, each having a bottom and the opening A1.

The foregoing devices, i.e. source 11 of pouch forming plastic film, check valve series supply device 12, check valve cutting device 13, provisional check valve joining device 14, folding guide 16, first heat sealing device 17, second heat sealing device 19, plastic film advancing device 20 and pouch cutting mechanism 21, are operable intermittently and synchronously.

Thus, the check-valved pouch manufacturing apparatus according to the present invention has an outstanding advantage of continuously, reliably and efficiently mass-producing check-valved pouches with excellent features as noted above.

DETAILED DESCRIPTION OF THE PREFERRED EMBODIMENTS

Check-valved pouches according to the present invention will be described in detail with reference to the drawings.

Figure 1:
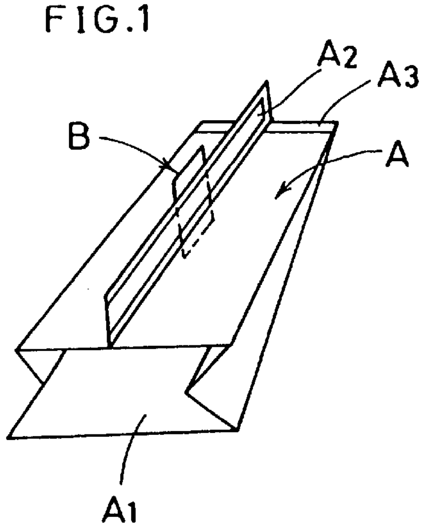
FIG. 1 is a schematic perspective view of a check-valved pouch in one embodiment of the present invention.

As shown in FIG. 1, a pouch includes a substantially rectangular main pouch body A formed of plastic film having excellent impermeability, and a flat check valve B formed of plastic film and attached to one side of the main pouch body A for discharging air from inside the pouch. The main pouch body A includes an opening A1 defined at one end thereof for receiving goods, and a heat seal portion A2 formed on the above-mentioned one side. When forming the heat seal portion A2, a lower portion of the check valve B is inserted into the main pouch body A, with an upper portion thereof projecting from the main pouch body A. In this way, the check valve B is integrated to the main pouch body A. The main pouch body A further includes a heat seal portion A3 formed at the bottom thereof.

Figure 2:
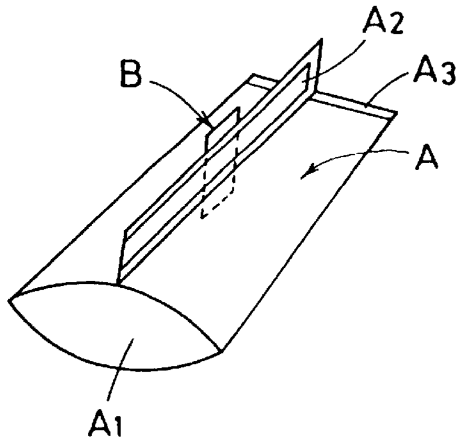
FIG. 2 is a schematic perspective view of a check-valved pouch in another embodiment of the present invention.

FIG. 2 shows a pouch in another embodiment of the invention, which has an approximately cylindrical main pouch body A formed of plastic film, and which has the same function as the pouch shown in FIG. 1. The main pouch body A is in fact a pouch itself formed of plastic film, and is not limited to those shown in FIGS. 1 and 2, as long as the check valve is attachable thereto.

Figure 3:
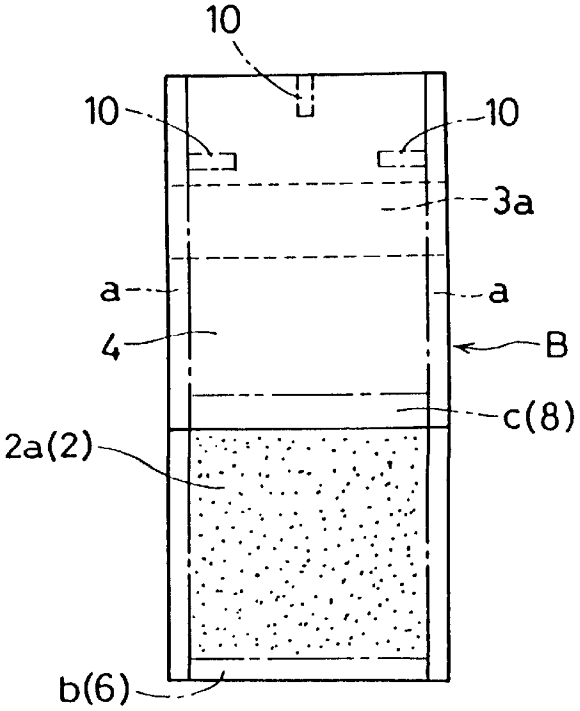
FIG. 3 is a front view of a check valve used in the present invention.
Figure 4:
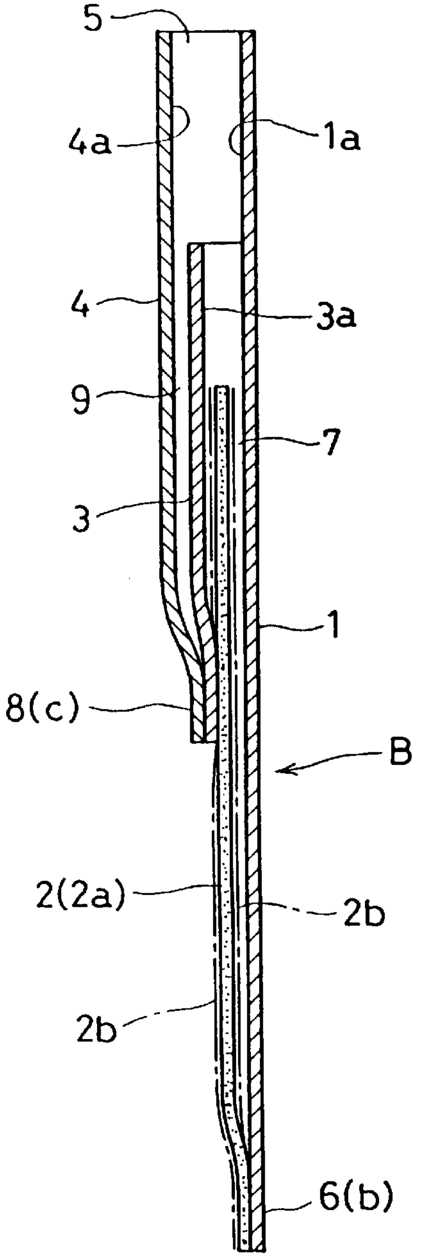
FIG. 4 is an enlarged side view in vertical section of the check valve shown in FIG. 3.

In this invention, as shown in FIG. 3 and FIG. 4 (enlarged sectional view), the check valve B is a laminate of four films, i.e. a vertically elongated, rectangular, heat sealable plastic film 1, a filtering film 2 consisting of heat sealable, porous, nonwoven plastic fabric as wide as and slightly shorter than the plastic film 1, a thin, heat sealable plastic film 3 as wide as and much shorter than the plastic film 1, and a heat sealable plastic film 4 as wide and thick as and shorter than the film 1 but longer than the plastic film 3. The filtering film 2 is placed on one surface of the plastic film 1, with lower ends thereof aligned to each other. The films 3 and 4 are placed on a surface of the filtering film 2, with lower ends of the films 3 and 4 aligned to each other and opposed to an upper position of the filtering film 2.

Next, each of the opposite sides of the film laminate is fused together by heating to form a sealed edge "a". The lower ends 6 of films 1 and 2 are fused together by heating to form a sealed edge "b". Further, the lower ends 8 of films 3 and 4 are fused together by heating to form a sealed portion "c" of the three films 2, 3 and 4. Thus, an opening 5 is formed at an upper end of the check valve B based on the different sizes and sealed positions of the films. The film 1 has an upper inner surface acting as a contact surface 1*a* for contacting a check piece 3*a* described below. A passage 7 is formed between the film 1 and filtering film 2 for discharging gases. The check piece 3*a* is defined by an upper half of the film 3 projecting above an upper end of the filtering film 2. A pocket 9 is formed between the films 3 and 4 for operating the check piece 3*a*. An upper portion of the film 4 projects above an upper end of the film 3 to define an extension surface 4*a*. The filtering film 2 includes a filter surface 2*a* disposed below the sealed portion "c" at the lower ends 8 of the films 3 and 4.

In this embodiment, as shown in FIG. 4, a releasing agent or agents such as silicon oil and/or polyethylene glycol is/are applied to and diffused on the filter surface 2*a* of filtering film 2 to form a releasing film 2*b* thereon. Thus, the check valve B effectively prevents the filtering film 2 from inadvertently sticking to the inner surface of the film 1, which would impair the filtering and gas discharging functions. Numeral 10 in FIG. 3 denotes heat seal portions formed adjacent the opening 5 to narrow the fluid passage, thereby to adjust a discharge flow rate.

Next, the check valve B is attached to the main pouch body A containing a powdery or granular substance, with the opening 5 at the upper end of the check valve B projecting from the main pouch body A, and the filter surface 2*a* of the filtering film 2 disposed inside. After the substance is loaded into the main pouch body A through the opening A1, the opening A1 is sealed by heating. As a result, the substance is enclosed in the pouch, the interior of the pouch being communicable with the ambient only through the filter surface 2*a,* gas discharge passage 7 and opening 5 of the check valve B.

Figure 6:
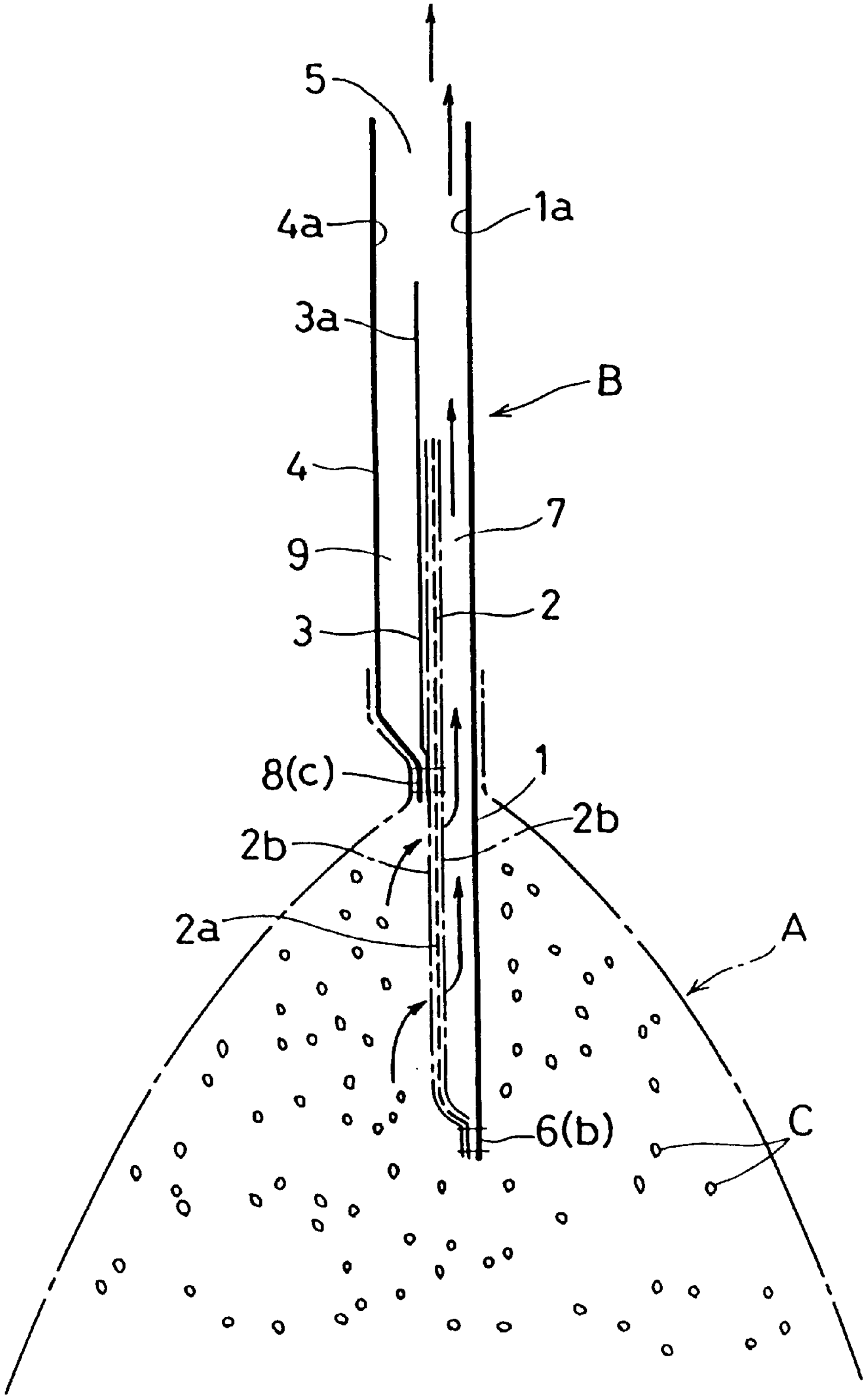
FIG. 6 is an explanatory view of an operation of the check valve to discharge gases from inside the pouch.
Figure 7:
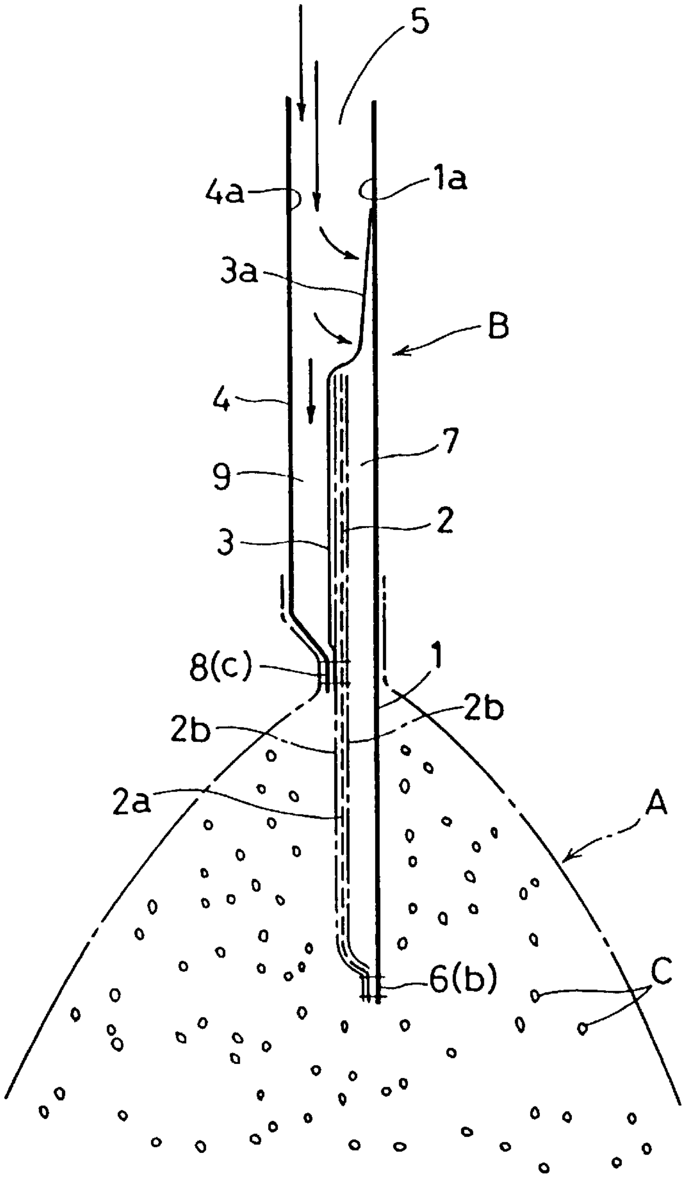
FIG. 7 is an explanatory view of an operation of the check valve to prevent entry of ambient air.

The functions and effects of the above embodiment will be described hereinafter with reference to FIGS. 6 and 7.

Figure 5:
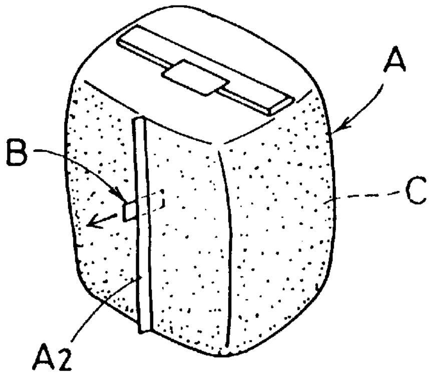
FIG. 5 is a perspective view of a sealed, check-valved pouch according to the present invention, which contains a powdery or granular substance.

It is assumed here that the pouch contains ground coffee. Ground coffee is placed in the main pouch body A through the opening A1, and then the opening A1 is sealed (FIG. 5). As noted hereinbefore, the pouch contains a considerable amount of air as well as ground coffee. In addition, the ground coffee generates a gas through fermentation inside the pouch. An external pressure may be applied to the main pouch body A after sealing the main pouch body A with ground coffee C placed therein. Alternatively, a suction nozzle of a vacuum device not shown may be inserted into the passage 7 through the opening 5 of the check valve B. Then, as shown in FIG. 6, air is discharged along with other unwanted gases from the main pouch body A through the filter surface 2*a* of the filtering film 2 into the passage 7, and out through the opening 5. The ground coffee C in the main pouch body A is prevented by the filter surface 2*a* from being discharged from the main pouch body A. Such gas discharging action takes place constantly, for example, by gravity while a plurality of pouches are stacked in storage.

In such a condition, the filtering and gas discharging action may often be restricted or lost by the inner surface of the filtering film 2 in tight contact with the inner surface of the plastic film 1. In this embodiment, however, the releasing film 2*b* of silicon oil and/or polyethylene glycol is formed on the filter surface 2*a* of filtering film 2. This reliably prevents the inner surface of the filtering film 2 from sticking to the inner surface of the plastic film 1, thereby to assure an excellent filtering action of the filtering film 2 and excellent gas discharge through the passage 7.

When the main pouch body A is decompressed as a result of gas discharge, ambient air tends to flow into the main pouch body A through the opening 5 and passage 7 of the check valve B. However, ambient air positively flows into the pocket 9 as well. The check piece 3*a* of the thin film 3 sensitively responds to the pressure of the incoming air and bulges outward as shown in FIG. 7. As a result, the check piece 3*a* moves into tight contact with the contact surface 1*a* formed on the upper inner surface of the film 1 to close the exit of passage 7. Thus, ambient air is stopped entering the pouch, to maintain the pouch interior in a decompressed state.

Moreover, the filter surface 2*a* of the filtering film 2 has an adjustable area to optimize an amount per unit time of gases discharged from the pouch. This feature provides the advantage of reliably avoiding the filter surface 2*a* being clogged by ground coffee C.

Figure 8:
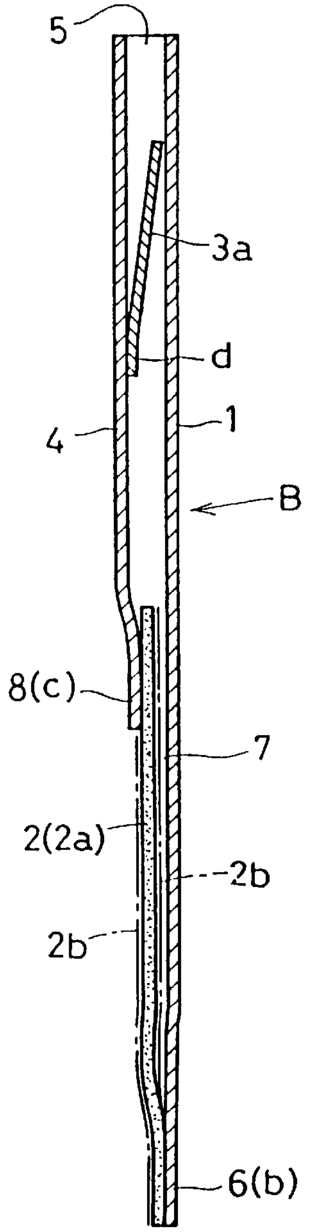
FIG. 8 is an enlarged side view in vertical section of a check valve in a further embodiment of the present invention.

FIG. 8 shows a check valve B in a further embodiment of the present invention.

This embodiment excludes the plastic film 3 disposed between the filtering film 2 and plastic film 4 of the check valve B in the preceding embodiment. Consequently, the pocket 9 is not formed but, as shown in FIG. 8, the check valve B includes a check piece 3*a* formed of a rectangular thin plastic film and mounted above the filtering film 2, adjacent the opening 5, and in a gas passage (extension of passage 7) between plastic films 1 and 4.

This check piece 3*a* is a plastic film piece extending backward through the gas passage and attached in a position "d" to the plastic film 4, to prevent ambient air from flowing into the main pouch body A. Though not depicted in detail, opposite sides of the check piece 3*a* in the form of a square plastic film piece are joined to opposite sides of the passage formed between the plastic films 1 and 4. The inward edge, with respect to the direction of gas flow, of the check piece 3*a* is joined in the position "d" to one of the plastic films 1 and 4 (the plastic film 4 in the illustrated example). The position "d" defines closing and opening portions. The outer end of the check piece 3*a* is not joined to the plastic film 1 or 4, to be free between the inner surfaces of the plastic films 1 and 4. Thus, a passage is formed to extend from the opening portion at the inner end of the check piece 3*a* to one opening portion at the outer end thereof, for discharging gases from inside the main pouch body A. The closing portion defined by the position "d" of the check piece 3*a* prevents ambient air from entering the main pouch body A. The pouch with this check valve B also has the same advantages as in the previous embodiment, based on the releasing film 2*b* formed on the filter surface 2*a* of filtering film 2.

The check piece 3*a* used in the present invention is not limited in construction and arrangement to the two embodiments described hereinbefore. The invention may employ various known check pieces.

Next, an apparatus for manufacturing the check-valved pouch according to the present invention will be described in detail with reference to the drawings.

Figure 9:
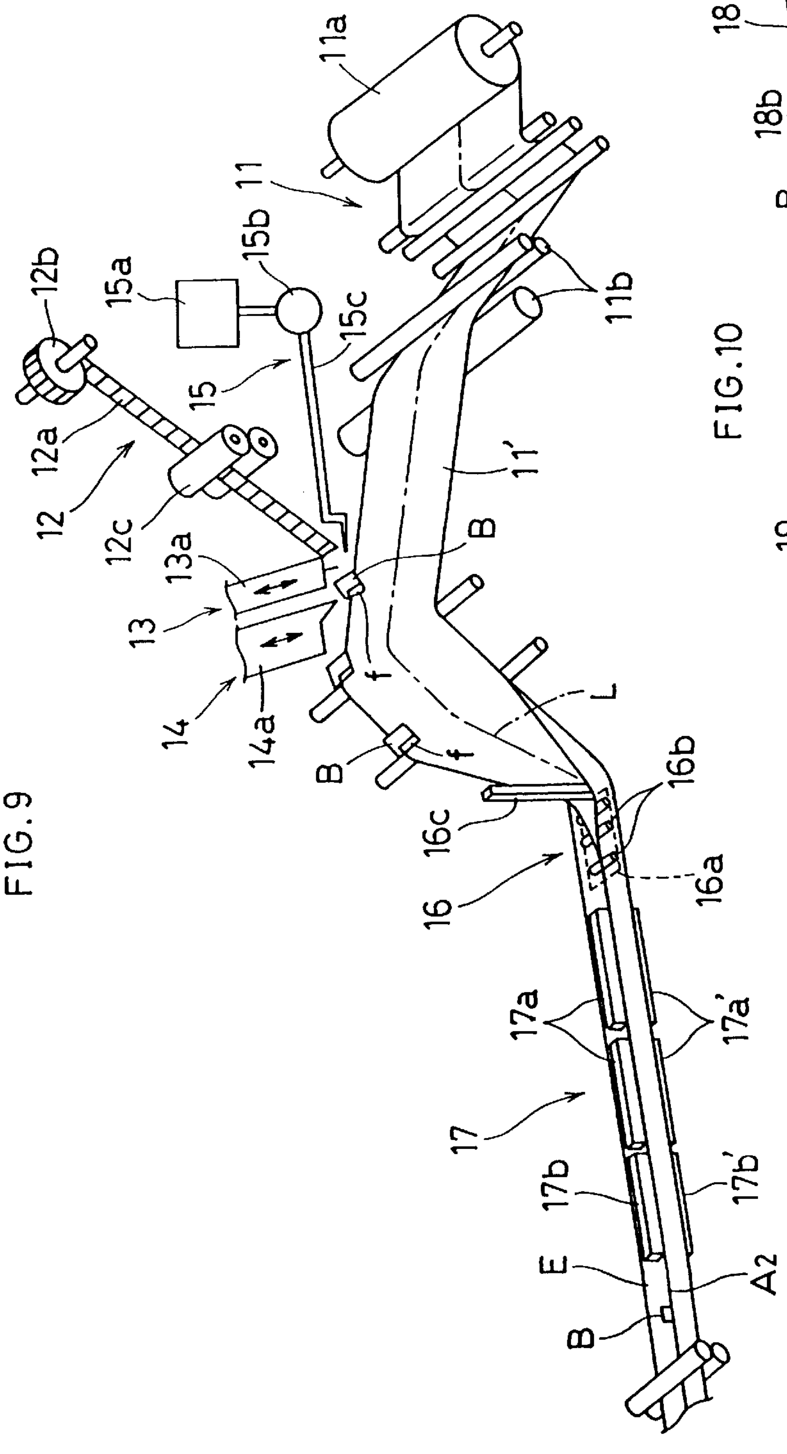
FIG. 9 is a perspective view of a first half of a manufacturing line in an apparatus for manufacturing pouches each with a check valve according to the present invention.
Figure 10:
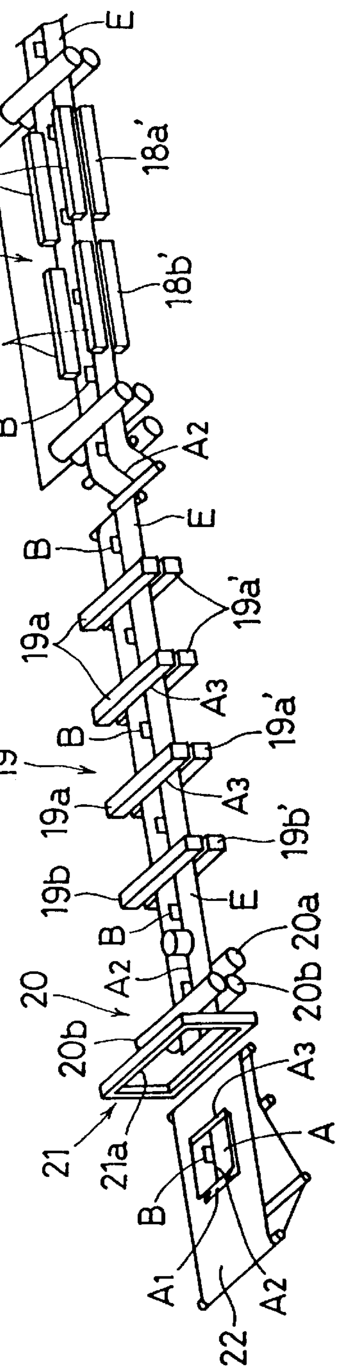
FIG. 10 is a perspective view of a second half of the manufacturing line.

As shown in FIG. 9, this manufacturing apparatus, broadly, includes a device 11 for supplying elongate plastic film 11' which forms pouches, a device 12 for supplying an elongate series 12*a* of flat check valves B formed of plastic film and interconnected in succession, a check valve cutting device 13 for cutting the series to separate check valves B, a device 14 for provisionally joining the check valves B to the plastic film 11', a device 15 for forming the releasing film 2*b* on the reverse surface of each check valve B (the filter surface 2*a* of filtering film 2), a folding guide 16 for folding the plastic film 11' into a flat tube form, and a first heat sealing device 17 for heat sealing opposite sides of the folded plastic film 11' to form an elongate flat tube E. Referring to FIG. 10, the apparatus further includes a shaping heat sealing device 18 for heat sealing and shaping opposite sides of the elongate flat tube E, a second heat sealing device 19 for heat sealing the shaped elongate flat tube E transversely thereof and at predetermined intervals to form bottom heat seal portions A3 on the flat tube E, a device 20 for intermittently advancing the plastic film 11', a cutting mechanism 21 for cutting the pouches, and a belt conveyor 22 for transporting the cut pouches.

The device 11 for supplying elongate plastic film 11' includes plastic film stock 11*a* in the form of a roll of elongate thermally fusible plastic film 11', and a plurality of guide rollers 11*b* for guiding the plastic film 11' to a predetermined position.

The check valve supplying device 12 includes check valve stock 12*b* in the form of a roll of the elongate series 12*a* of check valves B interconnected in succession, with the filtering film 2 of each check valve B disposed outside, and feed rollers 12*c* for intermittently advancing the check valve series 12*a*, with the filtering film 2 of each check valve B facing downward. The check valve stock 12*b* is disposed above and at a large angle to the plastic film stock 11*a*.

The check valve cutting device 13 is disposed adjacent one side of the plastic film 1, and includes a presser 13*a* disposed above a moving track of the check valve series 12*a* to be vertically movable by a cylinder mechanism (not shown) to press upon the check valve series 12*a* intermittently, a cutter 13*b* mounted in a lower position of the presser 13*a* to be intermittently reciprocable transversely of the check valve series 12*a* by a cylinder mechanism (not shown), a presser stopper 13*d* fixed below the presser 13*a* and opposed thereto across the check valve series 12*a*, the stopper 13*d* defining a recess 13*c* for receiving the cutter 13*b*.

The device 14 for provisionally joining the check valves B is disposed adjacent the one side of the plastic film 1, and includes a sealer 14*a* disposed adjacent and forwardly of the presser 13*a* to be movable vertically and intermittently by a cylinder mechanism (not shown), and a sealer stopper 14*b* fixed below the sealer 14*a* and opposed thereto across the plastic film 11'.

Figure 11:
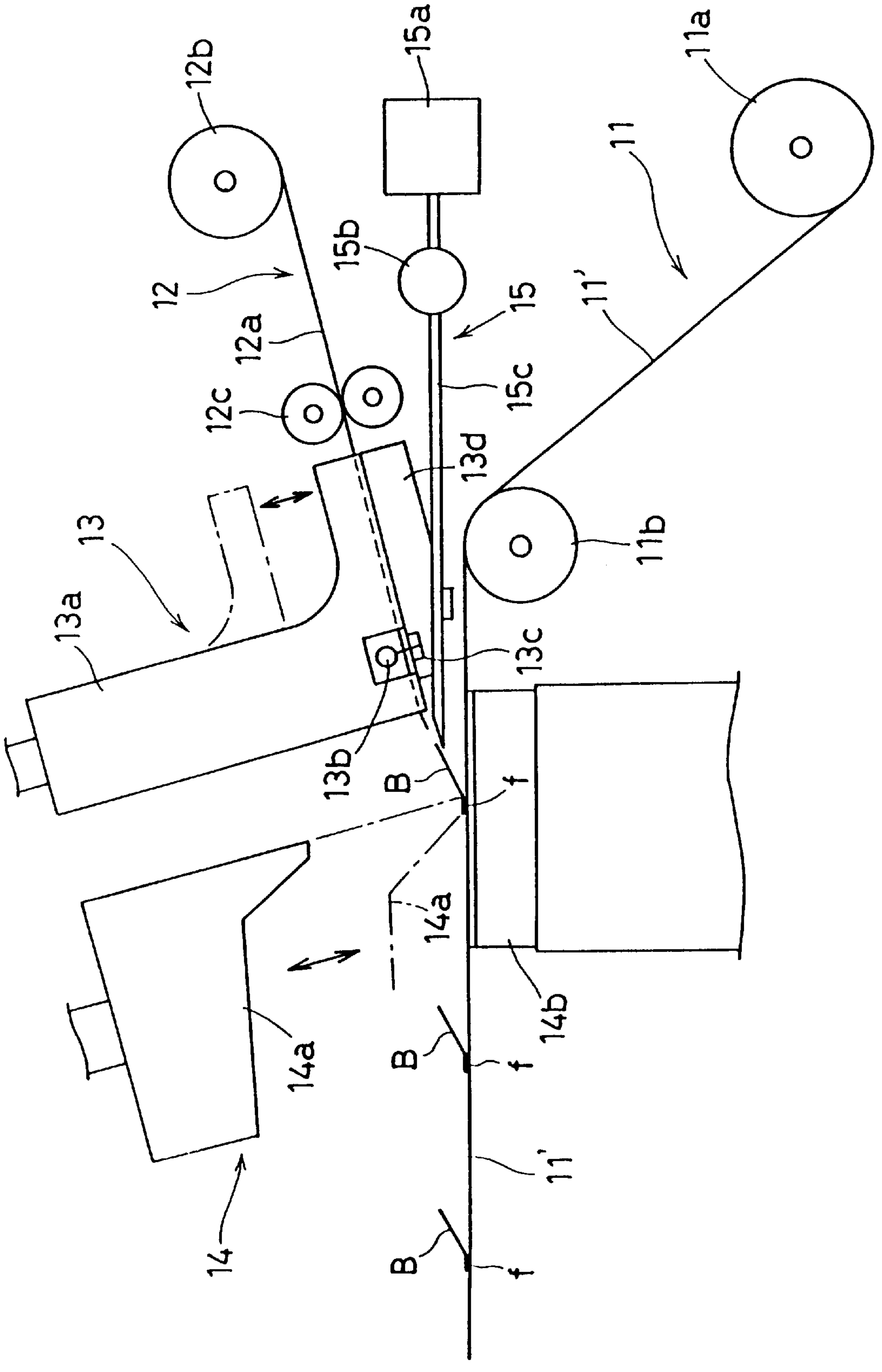
FIG. 11 is a schematic view of a provisional check valve cutting station, a provisional joining station and a release film forming station.

The device 15 for forming the releasing film 2*b* on the filter surface 2*a* of filtering film 2 includes a tank 15*a* for storing a releasing agent or agents such as silicon oil and/or polyethylene glycol, and a releasing agent supply nozzle 15*c* connected to the tank 15*a* through a delivery pump 15*b*. As shown in FIG. 11, the nozzle 15*c* has a forward end thereof disposed adjacent the lower surface (i.e. the filter surface 2*a* of filtering film 2) of each check valves B provisionally joined to the upper surface at the one side of the plastic film 11'.

The folding guide 16 for folding the plastic film 11' into a flat tube form is disposed forwardly of the sealer 14*a*, and includes a folding plate 16*a* disposed on the upper surface of the plastic film 11' in a way not to hamper smooth movement of the plastic film 11', plural pairs of short guide rollers 16*b* arranged above the plate 16*a* and at opposite sides of a centerline L of the film, and a support post 16*c* for supporting the plate 16*a*.

The first heat sealing device 17 for heat sealing the opposite sides of the folded plastic film 11' to form the elongate flat tube E is disposed forwardly of the folding guide 16, and includes elongate heat seal elements 17*a* and an elongate cooling element 17*b* arranged along the centerline L of plastic film 11' to be vertically movable by cylinders (not shown), and elongate stoppers 17*a'* and 17*b'* arranged below these elements 17*a* and 17*b*, respectively.

The shaping heat sealing device 18 is disposed forwardly of the first heat sealing device 17, and includes a pair of right and left elongate heat seal elements 18*a* and a pair of right and left elongate cooling elements 18*b* arranged along and above the opposite sides of the flat tube E to be vertically movable by cylinders (not shown), and pairs of right and left elongate stoppers 18*a'* and 18*b'* arranged below these elements 18*a* and 18*b*, respectively.

The second heat sealing device 19 is disposed forwardly of the shaping heat sealing device 18, and includes elongate heat seal elements 19*a* and an elongate cooling element 19*b* arranged successively above the flat tube E and extending transversely thereof to be vertically movable by cylinders (not shown) for forming the bottoms of the pouches, and elongate stoppers 19*a'* and 19*b'* arranged below these elements 19*a* and 19*b* and extending transversely of the flat tube E, respectively.

The device 20 for intermittently advancing the plastic film 11' is disposed forwardly of the second heat sealing device 19, and includes a servomotor 20*a*, and a pair of upper and lower feed rollers 20*b* intermittently rotatable by the servomotor 20*a*. The cutting mechanism 21 includes a guillotine blade 21*a* disposed forwardly of the intermittent advancing device 20 for cutting the pouches. The belt conveyor 22 is disposed forwardly of the cutting mechanism 21 for transporting the cut pouches.

An operation of the above apparatus for manufacturing the check-valved pouches will be described next with reference to FIGS. 9 through 11.

As shown in FIG. 9, the elongate plastic film 11' drawn from the plastic film stock 11*a* is passed through the guide rollers 11*b* and other guide rollers. Then, the plastic film 11' is passed, with the opposite sides thereof manually folded toward each other, between the folding plate 16*a* and folding guide rollers 16*b*.

The plastic film 11' folded into the flat tube form is passed between the heat seal elements 17*a* and stoppers 17*a*' and between the cooling element 17*b* and stopper 17*b*' arranged along the opposite sides of the plastic film 11' (centerline L). Subsequently, as shown in FIG. 10, the plastic film 11' folded into the flat tube form is passed between the pair of right and left shaping elongate heat seal elements 18*a* and the stoppers 18*a*' vertically opposed thereto across the opposite edges of the plastic film 11' and between the pair of right and left elongate cooling elements 18*b* and the stoppers 18*b*' thereof.

Next, the plastic film 11' folded into the flat tube form is passed between the heat seal elements 19*a* and the respective stoppers 19*a'* vertically opposed to each other and arranged at predetermined intervals to extend transversely of the plastic film 11'. Then, the forward end of the plastic film 11' folded into the flat tube form is held between the pair of upper and lower intermittent feed rollers 20*b*, to complete a manual preparatory operation to place the elongate plastic film 11' in position.

On the other hand, as shown in FIGS. 9 and 11, the series 12*a* of flat check valves B drawn from the check valve stock 12*b* is placed between the feed roller 12*c*, with the filtering film 2 facing downward. Then, the forward end of the check valve series 12*a* is manually drawn over the upper surface of the presser stopper 13*d* of the check valve cutting device 13 to a position forwardly of the check valve cutting device 13. This completes a preparatory operation to place the elongate check valve series 12*a* in position.

After completing the preparation as noted above, the feed rollers 20*b* and feed rollers 12*c* are rotated intermittently to feed the plastic film 11' and check valve series 12*a* intermittently forward. The sealer 14*a* of the provisional joining device 14 and the presser 13*a* of the check valve cutting device 13 are moved vertically and intermittently. At the same time, the cutter 13*b* is reciprocated intermittently and transversely of the check valve series 12*a*. Further, at the same time, the supply pump 15*b* is operated to supply the releasing agent or agents stored in the tank 15*a* intermittently from the forward end of the supply nozzle 15*c* toward the filtering films 2 of the check valves B.

The above intermittent operations may be effected synchronously and in a well-timed manner by a known control device (not shown). Consequently, operations are carried out at the same time to cut individual check valves B from the check valve series 12*a*, to join the cut check valves B provisionally to provisional attachment positions "f" on the surface of the plastic film 11', and to apply the releasing agent or agents to the filtering films 2 of the provisionally joined check valves B. The check valves B provisionally joined at fixed intervals are successively advanced forward with the plastic film 11' toward the plastic film folding guide 16.

The plastic film 11' having reached the folding guide 16 is folded into the flat tube form by the folding plate 16*a* and folding guide rollers 16*b*. Consequently, each check valve B provisionally joined to provisional attachment position "f" is moved to a meeting position between the opposite sides of the plastic film 11' before advancing to the first heat sealing device 17.

The plastic film 11' folded into the flat tube form and reaching the first heat sealing device 17 already has the opposite sides thereof brought together. These opposite sides are thermally joined between the heat seal elements 17*a* in intermittent vertical movement and the stoppers 17*a*'. Thereafter, the joint is cooled between the cooling element 17*b* in intermittent vertical movement and the stopper 17*b*' to form the elongate flat tube E. Each check valve B is securely attached to the flat tube E, with the filtering film 2 inserted into the flat tube E and the opening 5 projecting therefrom. The flat tube E and check valves B are advanced to the shaping heat sealing device 18.

The opposite sides of the flat tube E having reached the shaping heat sealing device 18 are shaped and sealed between the heat seal elements 18*a* in intermittent vertical movement and the stoppers 18*a*', and thereafter cooled between the cooling element 18*b* in intermittent vertical movement and the stopper 18*b*'. The shaped elongate flat tube E is advanced to the second heat sealing device 19.

The above shaping heat sealing device 18 is provided only for the shaping purpose, and is not an essential component of the check-valved pouch manufacturing apparatus according to the present invention.

The flat tube E having reached the second heat sealing device 19 is heated between the heat seal elements 19*a* in intermittent vertical movement and the stoppers 19*a*', whereby the flat tube E is sealed transversely between adjacent check valves B securely attached thereto. Subsequently, the joints are cooled between the cooling element 19*b* in intermittent vertical movement and the stopper 19*b*'. The flat tube E, with a plurality of pouch bottom heat seal portions A3 arranged at fixed intervals, is advanced through the feed rollers 20*b* of the intermittent advancing device 20 to the pouch cutting mechanism 21. The guillotine blade 21*a* of the cutting mechanism 21 successively cuts the pouches from the flat tube E forwardly or rearwardly of the heat seal portions A3. As a result, the check-valved pouches are continuously manufactured, each having the described construction with the bottom and the opening A1.

According to this manufacturing apparatus, the check-valved pouches are mass-produced reliably, continuously and efficiently, with the excellent releasing film 2*b* of silicon oil and/or polyethylene glycol formed on the filter surface 2*a* of filtering film 2 of each check valve B inserted into the pouch, in order to prevent reliably the filtering film 2 from sticking to the inner surface of the plastic film 1 of the check valve.

When manufacturing the check-valved pouches with this apparatus, naturally, a known heat seal preventive agent is applied to positions of the plastic film 11' and check valves B which should not be sealed by the heat sealing devices.

Although the check-valved pouch and manufacturing apparatus therefor in principal embodiments of the present invention have been described and illustrated in detail, the present invention is not limited to these embodiments. Various modifications are possible to fulfill the objects of the invention without departing from the spirit and scope thereof. Thus, the present invention should be understood to embrace all such modifications.

What is claimed is:

1. A check-valved pouch, comprising:

a main pouch body formed of plastic film and defining an opening for receiving a substance; and a check valve formed of plastic film and attached to said main pouch body, said check valve including:

a flat valve body defining an upper opening, with other peripheries closed, and an inner passage for discharging gases toward said upper opening;

a check piece disposed in an upper region of said valve body; and a porous filtering film disposed below planes of said valve body defining said inner passage, said filtering film including a filter surface, and a releasing film located on said filter surface for forming a gas discharging passage;

wherein said check valve is attached to said main pouch body, with said upper opening exposed to ambient air, whereby an interior of said main pouch body is communicable with an exterior through said filter surface, said inner passage and said upper opening.

2. A check-valved pouch comprising:

a main pouch body formed of plastic film and defining an opening for receiving a substance; and a check valve formed of plastic film and attached to said main pouch body, said check valve including;

a flat valve body defining an upper opening, with other peripheries closed, and an inner passage for discharging gases toward said upper opening;

a check piece disposed in an upper region of said valve body; and a porous filtering film disposed below planes of said valve body defining said inner passage, said filtering film including a filter surface, and a releasing film formed on said filter surface;

wherein said check valve is attached to said main pouch body, with said filtering film inserted into said main pouch body and said upper opening exposed to ambient air, whereby an interior of said main pouch body is communicable with an exterior through said filter surface, said inner passage and said upper opening; and wherein said releasing film includes at least one of silicone oil and polyethylene glycol applied to said filter surface.

3. A check-valved pouch as defined in claim 2, wherein said check valve includes at least one heat seal portion adjacent said upper opening for narrowing said inner passage to control a discharge flow rate.

4. A check-valved pouch, comprising:

a main pouch body formed of plastic film and defining an opening for receiving a substance; and a check valve attached to said main pouch body, said check valve including:

a valve body having an elongate plastic film, a plastic filtering film shorter than said elongate plastic film and placed on said elongate plastic film, and two plastic films shorter than said elongate plastic film placed on said filtering film, the four films being sealed at opposite sides thereof, said valve body defining an upper opening;

a gas discharging inner passage formed between said elongate plastic film and said filtering film transversely joined together in lower positions thereof;

a check piece defined by an upper portion of an inner one of said two plastic films projecting above an upper end of said filtering film, said check piece being flexible to move into contact with an upper inner surface of said elongate plastic film; and a pocket formed between said two plastic films for operating said check piece, said pocket being formed by transversely joining lower positions of said two plastic films to an upper position of said filtering film;

wherein said filtering film includes a filter surface disposed below said lower positions of said two plastic films, and a releasing film located on said filter surface for forming a gas discharging passage, with said filtering film inserted into said main pouch body and said upper opening exposed to ambient air, whereby an interior of said main pouch body is communicable with an exterior through said filter surface, said inner passage and said upper opening.

5. A check-valved pouch comprising:

a main pouch body formed of plastic film and defining an opening for receiving a substance; and a check valve attached to said main pouch body, said check valve including:

a valve body having an elongate plastic film, a plastic filtering film shorter than said elongate plastic film and placed on said elongate plastic film, and two plastic films shorter than said elongate plastic film placed on said filtering film, the four films being sealed at opposite sides thereof, said valve body defining an upper opening;

a gas discharging inner passage formed between said elongate plastic film and said filtering film transversely joined together in lower positions thereof;

a check piece defined by an upper portion of an inner one of said two plastic films protecting above an upper end of said filtering film, said check piece being flexible to move into contact with an upper inner surface of said elongate plastic film; and a pocket formed between said two plastic films for operating said check piece, said pocket being formed by transversely joining lower positions of said two plastic films to an upper position of said filtering film;

wherein said filtering film includes a filter surface disposed below said lower positions of said two plastic films, and a releasing film formed on said filter surface, said check valve being attached to said main pouch body, with said filtering film inserted into said main pouch body and said upper opening exposed to ambient air, whereby an interior of said main pouch body is communicable with an exterior through said filter surface, said inner passage and said upper opening; and wherein said releasing film includes at least one of silicone oil and polyethylene glycol applied to said filter surface.

6. A check-valved pouch as defined in claim 5, wherein said check valve includes at least one heat seal portion adjacent said upper opening for narrowing said inner passage to control a discharge flow rate.

7. A check valve formed of plastic film, comprising:

a flat valve body including an opening defined at one end thereof, with other peripheries thereof closed, and an inner passage for discharging gases toward said opening;

a check piece disposed in said valve body and adjacent said opening; and a porous filtering film disposed below a plane of said valve body defining said inner passage and adjacent an end of said valve body remote from said opening, said filtering film including a filter surface, and a releasing film located on said filter surface for forming a gas discharging passage.

8. A check valve as defined in claim 7, wherein said valve body has an elongate plastic film, said filtering film, and two plastic films shorter than said elongate plastic film, successively placed one upon another, with opposite sides thereof joined to define said opening, said inner surface for discharging gases being formed between said elongate plastic film and said filtering film joined together at other ends thereof, said check piece being defined by an extension of an inner one of said two plastic films projecting from an end of said filtering film, with an inner surface of said elongate plastic film defining a contact surface, other sides of said two plastic films being joined to said filtering film transversely in a position at one side of said filtering film, thereby to define a pocket between said two plastic films for operating said check piece.

9. A check valve as defined in claim 7, wherein said check piece is formed of a rectangular thin plastic film and mounted in said inner passage and adjacent said opening, an inward end of said check piece being joined in a joint position, the other end being free, to stop entry of ambient air.

10. A check valve formed of plastic film, comprising:

a flat valve body including an opening defined at one end thereof, with other peripheries thereof closed, and an inner passage for discharging gases toward said opening;

a check piece disposed in said valve body and adjacent said opening; and a porous filtering film disposed below a plane of said valve body defining said inner passage and adjacent an end of said valve body remote from said opening, said filtering film including a filter surface, with a releasing film located on said filter surface, wherein said releasing film includes at least one of silicone oil and polyethylene glycol applied to said filter surface.

11. A check valve as defined in claim 10, wherein said valve body has an elongate plastic film, said filtering film, and two plastic films shorter than said elongate plastic film, successively placed one upon another, with opposite sides thereof joined to define said opening, said inner surface for discharging gases being formed between said elongate plastic film and said filtering film joined together at other ends thereof, said check piece being defined by an extension of an inner one of said two plastic films projecting from an end of said filtering film, with an inner surface of said elongate plastic film defining a contact surface, other sides of said two plastic films being joined to said filtering film transversely in a position at one side of said filtering film, thereby to define a pocket between said two plastic films for operating said check piece.

12. A check valve as defined in claim 10, wherein said check piece is formed of a rectangular thin plastic film and mounted in said inner passage and adjacent said opening, an inward end of said check piece being joined in a joint position, the other end being free, to stop entry of ambient air.

* * * * *